United States Patent [19]
Huggett

[11] 4,093,293
[45] June 6, 1978

[54] SHACKLES

[75] Inventor: Richard D. J. Huggett, Clanfield, England

[73] Assignee: Lewmar Marine Limited, Havant, England

[21] Appl. No.: 725,271

[22] Filed: Sep. 21, 1976

[30] Foreign Application Priority Data

Oct. 6, 1975 United Kingdom ............ 40865/75

[51] Int. Cl.² ........................................ F16G 15/08
[52] U.S. Cl. ................................ 294/83 R; 114/113; 403/369; 24/241 SB
[58] Field of Search ............ 403/369, 365, 367, 371, 403/381, 231; 24/241, 211 K; 114/108, 113, 114; 294/82 R, 83 R; 59/95; 85/51

[56] References Cited
U.S. PATENT DOCUMENTS

| | | | |
|---|---|---|---|
| 2,116,880 | 5/1938 | Dee | 114/108 |
| 2,625,005 | 1/1953 | Myers | 59/95 |
| 3,162,084 | 12/1964 | Wurzel | 85/51 |
| 3,466,009 | 9/1969 | Giles | 403/369 |
| 3,765,064 | 10/1973 | Hoober | 24/211 K |
| 3,879,147 | 4/1975 | Morell | 403/369 |
| 3,915,489 | 10/1975 | Murphy | 403/371 |
| 3,930,290 | 11/1974 | Mangels | 114/108 |

*Primary Examiner*—Trygve M. Blix
*Assistant Examiner*—D. W. Keen
*Attorney, Agent, or Firm*—Bacon & Thomas

[57] ABSTRACT

A marine shackle has a body with an integral post projecting from it, the integral post having an integral enlarged head. Retaining means for the shackle is an eye part an aperture in which can be passed freely over the head of the post. To retain the eye in the shackle a split collar is placed around the post between the aperture of the eye and the head of the post which is of dimensions such that the aperture is now not free to pass back over the head of the post. A spacer may be then positioned between the aperture of the eye and the body of the shackle to maintain the eye part permanently around the split collar. A particular conformation of latch for the closable/openable loop of the shackle is also disclosed.

1 Claim, 5 Drawing Figures

SHACKLES

FIELD OF THE INVENTION

This invention relates to shackles for marine use, particularly on yachts.

BACKGROUND OF THE INVENTION

These shackles need to be strong and completely reliable and yet manufactured as easily and as cheaply as possible. A particular area of difficulty lies in the securing into the shackle of the rotatably mounted eye which is to be semi-permanently attached to some part of the yacht and which therefore acts to retain the comparatively quickly-openable loop portion of the shackle.

Previous proposals for the securing of the eye have concentrated on ways of strongly fixing into a body of the shackle a separate bolt-like element which passed through an aperture in the eye part. This element was e.g. screwed into a screwed blind bore in the body, or passed into a blind bore and locked by a transverse dowel pin.

In an alternative approach, see U.S. Pat. No. 3,879,147, a head was secured, perhaps by welding onto an integral stem projecting outwardly from the body.

It can be seen that these proposals are undesirable from the point of view of manufacturing complexity and/or of reliability.

SUMMARY OF THE INVENTION

In the invention, a eye part is rotatably and permanently mounted to a body of a marine shackle by being secured on a stem portion of a post integral with the body and with an integral enlarged head, by a collar which when closed around the stem is entrapped on the stem between the body and the head and is of a dimension to prevent escape of the eye from the stem; an aperture in the eye which is penetrated by the stem is however large enough to allow free passage of the head along the aperture.

It can be seen that the only assembly action involved once the eye part is placed on the stem is the closing of the collar round the stem. Thereafter, at least in a preferred form of the invention, movement of the eye part away from the body will entrap and surround the collar, further supporting it against any tendency to separate from around the stem. The eye part is held in that position by spacer means. The spacer means conveniently surrounds the stem between the eye part and the body, and comprises two identical semi-circular components adapted to non-reversibly clip together at respectively adjacent ends. Then, the spacer can only be removed destructively.

In a preferred embodiment, the body will comprise an integral one-piece post with an enlarged head and the eye will comprise a closed figure with at one portion of its periphery, an aperture larger in cross sectional dimensions than the head of the post whereby the eye may be freely passed onto or off of the post by means of the aperture. Retaining means for holding the eye on the post comprise a split flanged collar having a split sleeve part of an internal diameter compatible with that of the post and an external diameter compatible with that of the aperture, and a flanged part of diameter larger than that of the aperture which when fitted within the aperture and about the post prevents the eye being drawn passed the enlarged head of the post and is engaged between the post and the wall defining the aperture.

It is also important that such shackles shall be easily and quickly released when desired, especially under racing conditions.

Preferably, the shackle of the invention has a latch which is relatively pivotable between a closed condition in which it forms a closed loop with the body, and an open position, and a lever pivoted in the body and adapted to hold the latch in the closed position but movable to a position to release the latch from its first position and allow it to open, interaction between the lever and the latch for the holding of the latch by the lever being through a pair of interengaging surfaces one on the latch and one on the lever which are generated by a line swept about the pivot axis of the lever at substantially constant radius. In this arrangement, the amount or direction of tensile force being experienced by the shackle will not affect substantially the force required to displace the lever, since this force will neither tend to lock the lever in its holding position nor urge it towards its releasing position.

A preferred arrangement is such that the lever is operable to move it from its latch-holding to its latch-releasing positions by forces having at least a major component parallel to, and preferably being directed substantially exactly parallel to, the plane in which tensile force is exerted on the shackle, in use. It is also preferred that the position of the exerting of the releasing force on the lever shall be at a greater radius from the axis of pivot of the lever than the surface by which the lever exerts its latch retaining action whereby a mechanical advantage is obtained by the operator in displacing the lever.

DESCRIPTION OF THE DRAWINGS

A particular embodiment of the invention will now be described with reference to the accompanying drawings.

DESCRIPTION OF A PREFERRED EMBODIMENT AND METHOD

Figure 1:
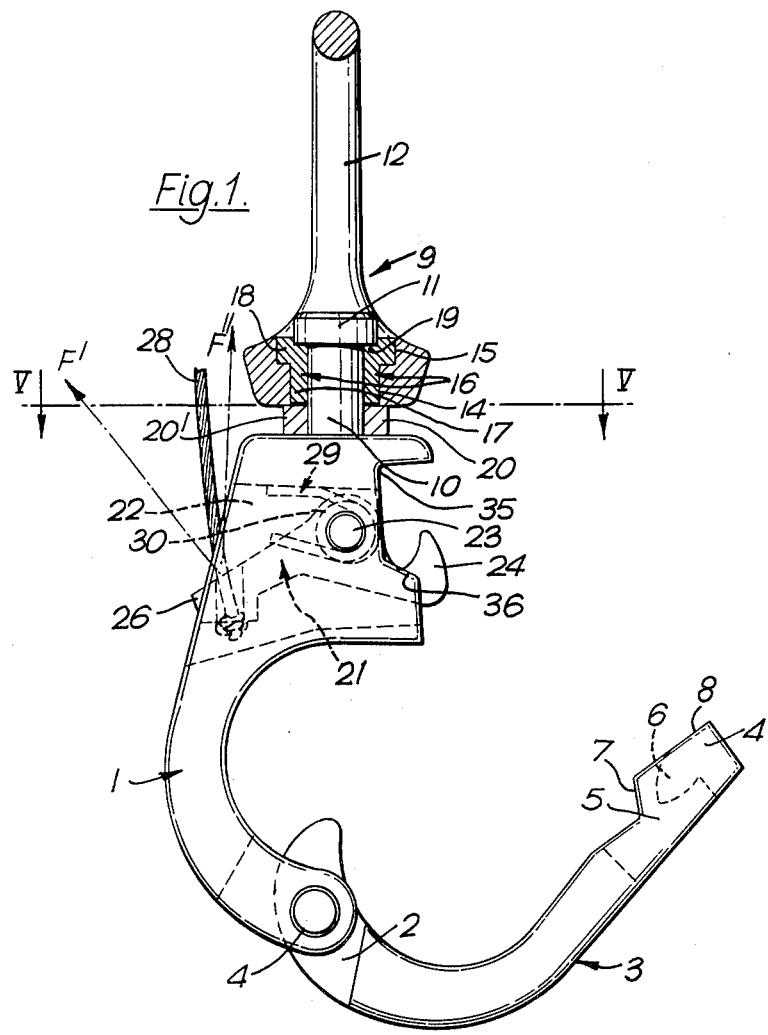
FIG. 1 is a side elevation, partly in section, of the embodiment.

In the drawings, a shackle consists of a body part 1 generally of C-shape having at one end a forked portion between the forks of which is received an end part 2 of a latch 3, the body 1 and the latch 3 being pivoted together at a pivot axis borne by a sturdy pivot pin 4.

At its other end, the latch has a head having an internal passage 5 into which projects a catch tongue 6. An overhanging pair of faces 7 of the head where a portion of the passage emerges from the head are for force-relieving engagement with a portion of the body as will be described later and a face 8 of the head is a stop face defining a closed position of the latch as will also be described.

Figure 4:
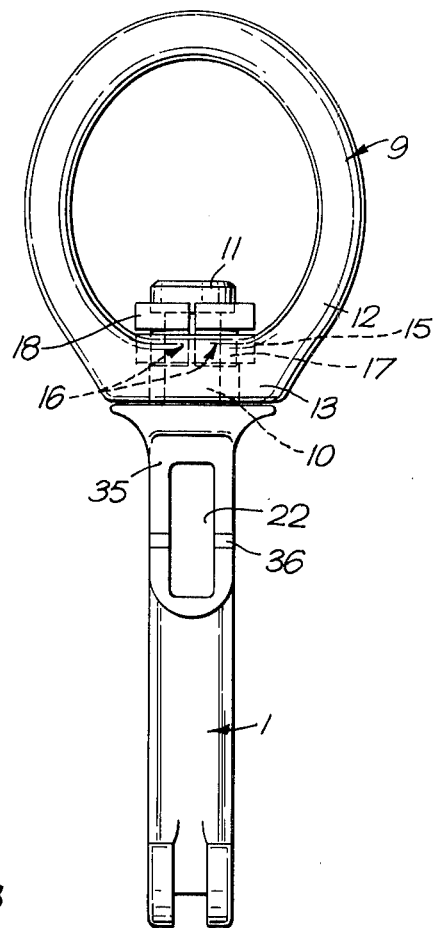
FIG. 4 shows in more detail, and in end view, the body and its retaining means.
Figure 5:
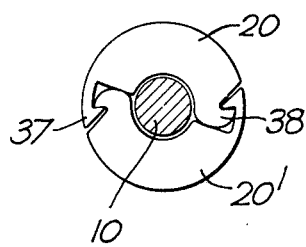
FIG. 5 is a section on the line V—V FIG. 1.

The body includes a retaining means generally indicated at 9 and which includes a post 10 integrally formed with the body and which has an enlarged head 11. On this, for rotation about the central axis of the post 10, is mounted an eye 12 which is for the permanent securing of the shackle to some element of the yacht, or through which a rope may be passed. The eye has a cylindrical aperture in its enlarged base 13 at one side of its periphery, the aperture consisting of a comparatively narrow cylindrical portion 14 and a comparatively wider cylindrical portion 15. The portion 14 is of a diameter just to clear the enlarged head 11 of the post. The eye may be freely put onto and taken from the post, in itself. However to retain it firmly on the post, a split flanged collar is provided consisting of a pair of identical parts 16 having a semi-cylindrical sleeve portion 17 of an internal diameter substantially the same as the outside diameter of the post and an external diameter substantially that of the portion 14 of the aperture in the eye. The flange 18 of each collar part 16 has an outer diameter substantially that of the wider portion 15 of the aperture in the eye and the radially inner part of its end face is provided with a rebate 19 which receives the under surface and a portion of the outer rim of the enlarged part 11 of the post. To assemble the eye to the rest of the body the eye is pushed down over the post, the two half collars 16 are placed around the post as indicated in FIG. 4 and the eye is then pulled up again, when its aperture 14,15 entraps the split collar between the eye and the post which when thus entrapped prevents the eye being pulled off the post. To prevent any release of tension on the eye allowing the eye to fall towards the body and thus allowing the collar to fall out a retainer ring 20,20' (in place of which other retaining means such as a diametrical pin or screw could be used) is then positioned around the post to space the eye and collar permanently from the upper surface of the body 1. The retainer ring is formed from two identical elements, as is best seen in FIG. 5. Each element has a generally semi-annular shape with a radially inwardly directed claw 37 at one end and an outwardly directed hook 38 at the other. When two of those elements are pressed together about the stem of the post 10. They snap together and can only be removed destructively.

Figure 2:
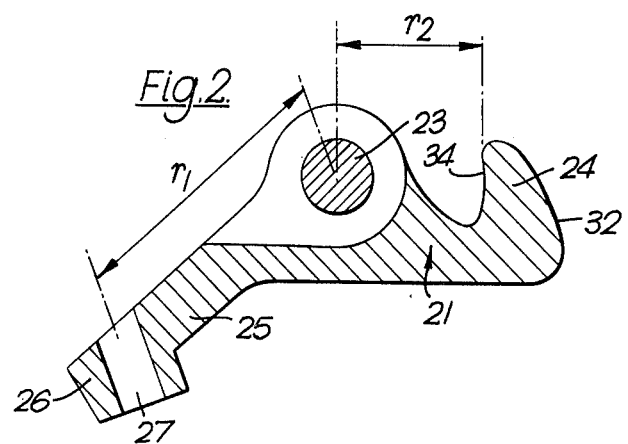
FIG. 2 is a section along the median line of a lever part, and on a larger scale than FIG. 1.
Figure 3:
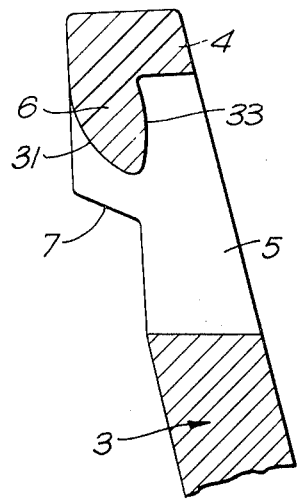
FIG. 3 is a section through a portion of a latch part and on a larger scale than FIG. 1.

To allow the retention of the latch 3 in a closed relation with the body there is a lever 21 (see also FIG. 2). This is pivoted in a channel 22 in the body on a sturdy pivot pin offset to one side of the centre line of the post 10, the pin 4 being offset to the other side of that centre line. The plane containing the centre line of the post 10 is the plane in which tensile force will be exerted on the shackle in use. The deposition of the pivots means that tensile force on the shackle tends to open the latch, which assures swift release when the lever is actuated. The lever, pivoted on pivot pin 23, extends through the body at an angle which is close to a right angle to the plane having at one side of the plane a catch tongue 24 for interaction with the catch tongue 6 on the latch 3 and the other side an arm 25 at the end of which remote from the pin 23 is an actuating head 26 in which a bore 27 is provided to allow reception and retention of a remote operation means such as knotted cord 28 FIG. 1. It can be seen that tractive force exerted through cord 28 on the head 26 of the lever will cause pivoting movement of the lever in a clockwise direction, provided the tractive force is exerted along lines which have at least a major component parallel to the plane. The range of directions in which this force can be exerted are indicated purely diagrammatically by arrows F' and F'' FIG. 1.

A spring 29 has a single turn 30 around the pin 23 between arms acting respectively on an upper end wall of the channel 22 and an upper surface of the lever arm 25 so as to tend to restore the lever in an anti-clockwise direction.

As has been stated the catch tongue 24 can interact with catch tongue 6. These tongues have a respective pair of striking surfaces 31,32 and retaining surfaces 33,34. The striking surfaces 31,32 are arranged so that as the latch approaches the closed position they glance against each other to displace the tongue 24 downwardly on a clockwise pivoting motion of the lever 21 against the spring 29 so that when tongue 6 has passed over tongue 24 the restoring action of the spring will cause the latch to be automatically caught and held by the catch tongue 24 of the lever 21.

Then, retaining surfaces 33,34 come into engagement and it is to be noted that surfaces 34 on catch tongue 24 of the lever is a part cylindrical surface generated by a straight line swept about the axis of the pivot 23 at substantially constant radius, the surface 33 being correspondingly shaped. By virtue of this, the amount of tractive force being exerted on the shackle will not affect substantially the amount of force required to be exerted on the lever 21 to release the latch.

The closed position of the latch is further defined by interaction between the stop face 8 on the latch and a corresponding face 35 on the body and support is provided by engagement of the overhanging relieving surfaces 7 of the latch with corresponding surfaces 36 on the body. That is to say the closed figure formed by the latch and body when held together is supported against tractive force both at the pivot pin 4 and where the head of the latch engages the body 1.

The effective radius (say) r1, (FIG. 2) of the arm 25 is greater than the effective radius for an opening action of the other arm of the lever 21 so that the yachtman is at a mechanical advantage against any frictional interaction between the tongues 24 and 6 which might tend to prevent smooth and rapid opening.

I claim:

1. In a marine shackle having a body comprising a closable and openable loop and a retaining means rotatably secured to the body the improvement comprising a post formed integrally in one piece with the body and having a cylindrical stem portion and a head portion of a diameter larger than that of the stem portion, the post penetrating an aperture in the retaining means, a split collar on the post in said aperture comprising two identical discrete parts held against lateral separation by the sides of said aperture and having at least a portion between the head portion and the retaining means effective to prevent movement of the retaining means away from the body over the head of the post, and spacer means surrounding the post and abuttable against both the body and the retaining means to maintain a fixed minimum spacing between said body and retaining means, the spacer means comprising two identical discrete parts engaged together to form an annulus about the stem portion, the said fixed minimum spacing being such that the retaining means is positioned so that said portion of the split collar is maintained between said head portion and the retaining means.

* * * * *